United States Patent [19]

Moore et al.

[11] 4,284,460

[45] Aug. 18, 1981

[54] HEAT SEALING UNTREATED SULFONAMIDE-TYPE CATION EXCHANGE MEMBRANES

[75] Inventors: Sanders H. Moore, Cleveland; John O. Adams, Madisonville, both of Tenn.

[73] Assignee: Olin Corporation, New Haven, Conn.

[21] Appl. No.: 34,317

[22] Filed: Apr. 30, 1979

[51] Int. Cl.$^3$ ................................................ C09J 5/00
[52] U.S. Cl. ............................... 156/306.6; 156/308.2; 156/333; 204/296; 210/506; 210/500.2; 428/421; 428/422; 521/27
[58] Field of Search ................. 156/94, 333, 309, 306, 156/306.6, 308.2; 210/500 M, 506; 428/421, 422; 528/391; 526/243; 521/27; 204/252, 301, 180 P, 296

[56] References Cited

U.S. PATENT DOCUMENTS

| | | | |
|---|---|---|---|
| 3,743,562 | 7/1973 | Phipps | 156/64 |
| 4,072,793 | 2/1978 | Watanabe et al. | 428/421 |
| 4,126,589 | 11/1978 | Hamada et al. | 526/243 |
| 4,151,053 | 4/1979 | Seko et al. | 204/252 |
| 4,165,248 | 8/1979 | Darlington et al. | 156/333 |
| 4,172,931 | 10/1979 | Leutner | 156/306 |

*Primary Examiner*—John J. Gallagher
*Attorney, Agent, or Firm*—Donald F. Clements; James B. Haglind

[57] ABSTRACT

A method of heat sealing together two untreated layers of a sulfonated perfluorovinyl ether ion exchange diaphragm or membrane material having pendant groups predominantly in the sulfonamide form by placing a layer of untreated sulfonated perfluorovinyl ether material having pendant groups predominantly in the sulfonic acid form between the sulfonamide layers to create a "sandwich". The preferred heat sealing involves applying from 1 to 5, and preferably from 3.5 to 5.0 kg/cm$^2$ pressure at from 260° to 350° C. and preferably from 280° to 320° C. for from 3.5 to 7.5, and preferably from 3.5 to 5.0 seconds to this "sandwich". It had been previously taught that such untreated sulfonamide layers could not be heat sealed together. The novel heat sealing technique of this invention enables fabrication of a cathode-membrane unit using ion exchange membranes having such a sulfonamide layer facing the cathode of an electrolytic cell.

9 Claims, No Drawings

HEAT SEALING UNTREATED SULFONAMIDE-TYPE CATION EXCHANGE MEMBRANES

This invention relates to electrolytic cells and more particularly to cation exchange membranes for such cells. The invention further relates to methods of heat sealing certain cation exchange membranes.

The terms "membrane" and "diaphragm" are used interchangeably in the following specification, unless otherwise indicated. "Diaphragm" is used broadly to include membranes and "membrane" is used broadly to include diaphragms.

"Untreated" as used herein in referring to a membrane layer means not chemically treated by the treatment specified in U.S. Pat. No. 3,884,885 or similar treatments specifically designed to change the membrane layer temporarily into a melt processable form. A membrane layer is still considered untreated if it has only undergone chemical modification by treatments such as the ethylene diamine (EDA) modification treatment described in U.S. Pat. No. 3,969,285 by which sulfonic acid radicals are replaced by sulfonamide radicals in order to enhance the layer's electrolytic properties.

Due to environmental concerns over mercury contamination and asbestos contamination, as well as the continual desire to produce high purity caustic product, the chlor-alkali industry has been giving increasing attention to the development of so-called ion exchange "membrane cells" and to the development of membranes for such cells. One type of cation exchange membrane which has been proposed and developed is a copolymer of a sulfonated perfluorovinyl ether with tetrafluoroethylene which is marketed by E. I. duPont de Nemours and Co. under the trademark "Nafion". During the fabrication of chlor-alkali cells using such membranes, it is sometimes desirable to seal sheets of such membranes together in order to form membrane structures adapted to enclose various electrode assemblies. It is also desirable to seal patches of such membrane material onto damaged portions of sheets or structures of such membrane material. U.S. Pat. No. 3,884,885 issued May 20, 1975 to W. G. Grot describes a method for melt processing sulfonated perfluorovinyl ether membrane materials, in which the membrane material must be treated with a tertiary amine, quaternary ammonium base or the salt of the amine or base in order to allow melt processing. The patent expressly states that fluorinated polymers which contain pendant side chains in the form of $-SO_3H$, salt thereof, or salt of $-SO_2NH_2$ cannot be practically processed or fabricated by the application of heat. Therefore, the industry has accepted that such chemical treatment is necessary prior to heat sealing such fluorinated polymers. For example, U.S. Pat. No. 4,061,550, issued Dec. 6, 1977 to Cook, Jr. and Emery, states in Column 6, lines 17–32 thereof that while the fluorinated polymer may be seam welded in the non-acid or sulfonyl fluoride form, it apparently cannot be seam welded after conversion into the acid form. This same conclusion is described in the Feb. 18, 1974 issue of "Chemical Engineering" at page 86, column 1.

However, German Offenlegungschrift No. 2,655,145, published June 8, 1978, teaches that the sulfonic acid form can be heat sealed under the proper conditions without the prior chemical treatment specified in U.S. Pat. No. 3,884,885. This discovery was somewhat surprising since E. I. duPont de Nemours and Co., currently the only major manufacturer of the material had, as noted above, indicated that such processing was impossible.

It is advantageous to fabricate the membrane material into a structure which will surround the cathode of an electrolytic cell. This is desirable because the vacuum deposited diaphragms currently in use are generally deposited upon the cathode and a cathode-enclosing membrane structure would most closely correspond to the conventional deposited diaphragms. However, while the sulfonic acid form of the fluorinated polymer can be heat sealed without prior chemical treatment, the untreated sulfonamide or $-SO_2NH_2$ form of the fluorinated polymer cannot be heat sealed to itself by the currently existing techniques used for the sulfonic acid or $-SO_3H$ form. There is thus a need for a method of joining the sulfonamide-type fluorinated polymers without prior chemical treatment.

A solution to this problem is the current invention which provides a method of joining two sheets of a cation exchange material, which material has not been treated with either a tertiary amine or a quaternary ammonium base or the salt of either said amine or said base, each of said sheets having a first side, which first side has an external layer of a sulfonated perfluorovinyl either polymer having pendant sulfonamide cation exchange groups, which consists essentially of the steps of:

(a) placing said sheets in a position with said first sides facing each other;

(b) placing a layer of a sulfonated perfluorovinyl either polymer having terminal sulfonyl groups in the form $-SO_3H$ on both sides thereof between said first sides of said sheets, wherein said sides have not been treated with either a tertiary amine or a quaternary ammonium base or the salt of either said amine or said base; and (c) heat sealing said layer to each of said first sides to thereby join said first sides.

With the above summary in mind, the invention will now be described in more detail in order to facilitate a better understanding thereof. The currently available forms of sulfonated perfluorovinyl ether cation exchange membranes are of two types. The first type has pendant sulfonic acid groups while the second has been chemically modified so that the pendant sulfonic acid groups are changed to pendant sulfonamide groups. The modification which results in this change consists of reacting the sulfonyl fluoride pendant groups with substances which will yield less polar bonding and thereby absorb fewer water molecules by hydrogen bonding. The preferred method currently used is to react the pendant groups with ethylene diamine to tie two of the pendant groups together by two nitrogen atoms in the ethylene diamine. Generally, in a film thickness of 7 mils, the ethylene diamine treatment will be done to a depth of approximately 2 mils on one side of a film membrane by means of a timed reaction procedure. The membrane thus modified has been found to exhibit good electrical conductivity and cation transmission with less hydroxide ion and associated water reverse migration. Therefore, the modified membrane is somewhat more desirable from a commercial standpoint than the membrane not so modified. The modified membrane, which now has pendant sulfonamide groups to a depth of approximately 2 mils on a first side or surface of the membrane, is usually placed in the chlor-alkali cell with the first side facing the cathode. However, the previously mentioned problem arises in that there is no currently available procedure known for heat sealing two of the first sides to one another without prior chemical treatments such as those described in U.S. Pat. No. 3,884,885 above. Through experimentation, it has now been unexpectedly found that the sulfonated perfluorovinyl ether with pendant sulfonamide cation exchange groups can be heat sealed to a layer of sulfonated perfluorovinyl ether having pendant sulfonic acid groups even though the layer of sulfonated perfluorovinyl ether with pendant sulfonamide groups (hereafter "sulfonamide layer") cannot be heat sealed to itself without prior chemical treatment. This is even more surprising since it has also been found that the untreated sulfonated perfluorovinyl ether material having either pendant sulfonamide groups or sulfonic acid groups cannot be practically heat sealed to any other known material by any known method without damage. The fact that untreated sulfonamide layers can now be heat sealed enables the fabrication of cathode-enclosing membrane structures which had heretofore been considered impractical because of the requirement for a prior chemical treatment, as described above. In fact, it had heretofore been thought that the best solution to this heat sealing problem with sulfonamide layers was to form anode-enclosing membrane structures since the untreated sulfonic acid sides of the membranes having sulfonamide layers could be sealed together. Thus, the untreated sulfonamide layers would be on the outside of the anode-enclosing structure so that the sulfonamide layers would face the cathode when the cell was fully assembled. However, such structures were not readily applicable to existing diaphragm cells since, as noted above, such diaphragm cells are designed to have the cathode, rather than the anode, enclosed by the diaphragm or membrane structure.

It has been found that by suitable temperature, pressure and time parameters sulfonamide layers can now be heat sealed together by interposing a layer of sulfonated perfluorovinyl ether having pendant sulfonic acid groups between the sulfonamide layers. In particular, it has been found that when sulfonamide layers are sealed together in this fashion at a pressure in the range from about 1 to about 5 kg/cm$^2$ for a heat sealing time in the range from about 3.5 to 7.0 seconds at a temperature in the range from about 260° to about 350° C., the sulfonamide layers, which as noted above have not been found sealable to any other material without degradation of the polymer, will bond to the interposed layer of sulfonic acid-type material. It is preferred that the heat sealing pressure be in the range from about 3.5 to about 5.0 kg/cm$^2$, that the heat sealing temperature be in the range from about 280° to about 320° C. and that the heat sealing time be in the range from about 3.5 to about 5.0 seconds. It has been found that the time and temperature are most critical while the pressure need only be somewhere within the range of about 1 to 5 kg/cm$^2$ or more, such pressure being sufficient to force the layers together at the time and temperature ranges given. It is felt that the critical time and temperature are those of the membrane material itself, rather than the machine parameters as listed above. However, since the material parameters can only be indirectly controlled by controlling the heat sealing equipment or machine, the parameters listed above are the machine parameters, i.e. the time, temperature and pressure of the heater press used to perform the heat sealing method of the invention. It will be understood that such machine parameters may vary if a different heater press is utilized, while it is believed the material parameters would have to be within the same ranges to achieve good results. It is believed that the use of pressure allows the sulfonamide layers to fuse with the interposed sulfonic acid layer when such fusion might not occur in the absence of pressure even if heat were applied for an extended time. One heater press used in the invention is a Vertrod Thermal Impulse heater press Model No. 54EV/BS-CAN-.5WC, manufactured by Vertrod, Inc. of Brooklyn, New York. It will be readily apparent that other heater presses may satisfactorily seal such materials at the same or different parameters as the Vertrod Thermal Impulse heater press and that the claims below are to be interpreted to cover the corresponding ranges, even if slightly different, for any different heater press which might be used to achieve the material parameters achieved by the Vertrod Thermal Impulse heater press.

The membranes, diaphragms and layers thereof of the invention are customarily supported on a tetrafluoroethylene filament fabric, such as "T-12", "T-24" or "T-900G" marketed by E. I. duPont de Nemours and Co. Such fabrics can be leno woven (e.g. "T-24") or basket woven (e.g. "T-12" and "T-900G") with any desired amount of open space in the fabric. For example, T-900G has about 70 percent open space after removal of rayon fibers therefrom and thus would have somewhat more ion exchange copolymer than T-12 or T-24 which have 30 percent or less open space.

From the examples below, it is clear that the heat sealing procedure of the invention can be successfully performed at a temperature of 260° C. or 350° C. and a time of 7.5 seconds or 3.5 seconds. Thus, these are probably not the operative extremes, even though they are specifically given in one or more claims, and hence the word "about" precedes their use in order to cover the actual limits of time and temperature which, with the benefit of the above disclosure, could be readily determined by routine trial and error testing. In view of the very expensive material being sealed, this experimentation was felt to be unjustified since it is generally not desired to heat seal at the extreme limits of the operative range as there is then little leeway for error. A broad range of equivalents is thus to be given the defined range of the claims.

EXAMPLE 1

Two layers of Nafion ® 295, which is a 7 mil thick film of a material which is a copolymer of 1150 equivalent weight perfluorosulfonic acid resin and tetrafluoroethylene supported on a tetrafluoroethylene and rayon filament (T-900) basket woven fabric and treated to a depth of 1.5 mils with ethylene diamine, are heat sealed to one another by interposing a layer of Nafion ® 427, which is a 7 mil thick film of a material which is a copolymer of 1200 equivalent weight sulfonated perfluorovinyl ether with tetrafluoroethylene supported on a leno woven tetrafluoroethylene fabric (e.g. T-12 fabric), therebetween and applying 3 kg/cm$^2$ of pressure for 4.5 seconds at 320° C. with a Vertrod Thermal Impulse heater press. The Nafion ® 295 and 427 layers are not chemically modified with tertiary amine, quaternary ammonium base or the salt of the amine or base prior to heat sealing. The "sandwich" of Nafion ® 295-Nafion ® 427-Nafion ® 295 produces a seal which is satisfactory when placed in a chlor-alkali cell and which does not separate during operation of the cell.

EXAMPLE 2

Two layers of Nafion ® 214 are sealed together by interposing a layer of Nafion ® 427 therebetween and applying 3 kg/cm² of pressure for 5.0 seconds at 280° C. with a Vertrod Thermal Impulse heater press. The Nafion ® 214-Nafion ® 427-Nafion ® 214 "sandwich" produces a seal which operates satisfactorily in a chlor-alkali cell and maintains the Nafion ® 214 layers together during operation of said cell. Nafion ® 214 is a homogeneous film 7 mils thick of 1150 equivalent weight perfluorosulfonic acid resin which has been chemically modified by ethylene diamine converting a depth of 1.5 mils to the perfluorosulfonamide laminated with a leno woven 400 denier, 10×10 thread count per centimeter, 7 mil thick tetrafluoroethylene fabric (e.g. T-24 fabric).

EXAMPLE 3

The sealing operation of Example 1 is repeated except that Nafion ® 295-Nafion ® 427-Nafion ® 295 sandwiches are sealed at various pressures between 1 and 5 kg/cm². The results are production of satisfactory seals when tested in chlor-alkali cells under normal operating conditions.

EXAMPLE 4

A sandwich of Nafion ® 295-Nafion ® 427-Nafion ® 295 is heat sealed at a pressure of 3 kg/cm² and a temperature of 350° C. for 3.5 seconds while a second sandwich of Nafion ® 214-Nafion ® 427-Nafion ® 214 is heat sealed at 3 kg/cm² pressure and 260° C. for 7.5 seconds. Both sandwiches produce satisfactory seals.

What is claimed is:

1. A method of joining two sheets of a cation exchange material, which material has not been treated with either a tertiary amine or a quaternary ammonium base or the salt of either said amine or said base, each of said sheets having a first side, which first side has an external layer of a sulfonated perfluorovinyl ether polymer having pendant sulfonamide cation exchange groups, which consists essentially of the steps of:
    (a) placing said sheets in a position with said first sides facing each other;
    (b) placing a layer of a sulfonated perfluorovinyl ether polymer having terminal sulfonyl groups in the form —$SO_3H$ on both sides thereof between said first sides of said sheets, wherein said sides have not been treated with either a tertiary amine or a quaternary ammonium base or the salt of either said amine or said base; and
    (c) heat sealing said layer to each of said first sides at a pressure within the range of from about 1 to about 5 kg/cm² and a temperature within the range of from about 260° C. to about 350° C. for a time within the range of from about 3.5 to about 7.5 seconds to thereby join said first sides.

2. The method of claim 2 wherein said time is within the range of from about 3.5 to about 5.0 seconds.

3. The method of claim 2 wherein said temperature is within the range of from about 280° C. to about 320° C.

4. The method of claim 2 wherein said pressure is within the range from about 3 to about 5 kg/cm².

5. The method of claim 2 wherein said time is within the range of from about 3.5 to about 5.0 seconds, said temperature is within the range of from about 280° C. to about 320° C. and said pressure is within the range of from about 3 to about 5 kg/cm².

6. The method of claim 1 wherein said external layer on said first sides is formed by reacting a sulfonated perfluorovinyl ether having pendant sulfonic acid groups with ethylene diamine.

7. The method of claim 6 wherein said external layer has a thickness in the range from about 1.0 to about 3.0 mils and is supported on a leno weave tetrafluoroethylene fabric support.

8. The method of claim 6 wherein said external layer has a thickness in the range from about 1.0 to about 3.0 mils and is supported on a basket weave-type tetrafluoroethylene fabric.

9. The method of claim 6 wherein said external layer has a thickness in the range from about 1.0 to about 3.0 mils thick and is supported on a tetrafluoroethylene filament fabric.

* * * * *

UNITED STATES PATENT AND TRADEMARK OFFICE
CERTIFICATE OF CORRECTION

PATENT NO. : 4,284,460
DATED : August 18, 1981
INVENTOR(S) : Sanders H. Moore and John O. Adams It is certified that error appears in the above-identified patent and that said Letters Patent are hereby corrected as shown below:

Column 6, Claim 2, line 18, delete "2" and insert --1--.

Column 6, Claim 3, line 20, delete "2" and insert --1--.

Column 6, Claim 4, line 22, delete "2" and insert --1--.

Column 6, Claim 5, line 24, delete "2" and insert --1--.

Signed and Sealed this

Thirty-first Day of August 1982

[SEAL]

Attest:

GERALD J. MOSSINGHOFF

Attesting Officer

Commissioner of Patents and Trademarks